United States Patent
Jung et al.

(10) Patent No.: US 7,424,288 B2
(45) Date of Patent: *Sep. 9, 2008

(54) CALL TRANSFER TO PROXIMATE DEVICES

(75) Inventors: Edward K. Y. Jung, Bellevue, WA (US); John D. Rinaldo, Jr., Bellevue, WA (US); Mark A. Malamud, Seattle, WA (US); Paul G. Allen, Seattle, WA (US); Royce A. Levien, Lexington, MA (US)

(73) Assignee: Searete LLC, Bellevue, WA (US)

( * ) Notice: Subject to any disclaimer, the term of this patent is extended or adjusted under 35 U.S.C. 154(b) by 358 days.

This patent is subject to a terminal disclaimer.

(21) Appl. No.: 10/995,889

(22) Filed: Nov. 22, 2004

(65) Prior Publication Data

US 2006/0128306 A1 Jun. 15, 2006

(51) Int. Cl.
*H04Q 7/38* (2006.01)
*H04M 3/58* (2006.01)

(52) U.S. Cl. .............. 455/416; 455/417; 455/41.2; 455/445; 455/456.3; 370/338

(58) Field of Classification Search .......... 455/417, 455/41.2, 41.3, 414.1–414.4, 518, 519, 556.1–556.2, 455/557, 445; 370/328, 329, 338
See application file for complete search history.

(56) References Cited

U.S. PATENT DOCUMENTS

| 2002/0085516 | A1 | 7/2002 | Bridgelall |
| 2003/0003900 | A1* | 1/2003 | Goss et al. ............. 455/417 |
| 2003/0073431 | A1* | 4/2003 | Dorenbosch ............ 455/417 |

OTHER PUBLICATIONS

PCT International Search Report; International App. No. PCT/US05/42383; May 22, 2006.

* cited by examiner

*Primary Examiner*—Philip J Sobutka
(74) *Attorney, Agent, or Firm*—Suiter Swantz pc llo

(57) ABSTRACT

A second communication device is detected in proximity to a first communication device engaged in a call, and a substantially uninterrupted transfer of the call is made to the second device.

50 Claims, 3 Drawing Sheets

CALL TRANSFER TO PROXIMATE DEVICES

TECHNICAL FIELD

The present disclosure relates to call transfer schemes.

BACKGROUND

Mobile communication devices are now a common feature, both in personal and commercial environments. Such devices continue to improve in both functionality and reliability. However, being adapted for mobility brings drawbacks. Such devices tend to have small, limited keyboards and small screens, among other limitations.

The users of mobile devices are often in proximity with other communication devices. These other devices may, due to their larger size, have advantages not readily available in more portable devices. For example, these other devices may have superior audio, video, or imaging capabilities relative to their mobile counterparts. For these and other reasons, it may be advantageous to employ the capabilities of proximate devices when communicating via mobile devices.

SUMMARY

The following summary is intended to highlight and introduce some aspects of the disclosed embodiments, but not to limit the scope of the claims. Thereafter, a detailed description of illustrated embodiments is presented, which will permit one skilled in the relevant art to make and use aspects of the subject matter described herein. One skilled in the relevant art can obtain a full appreciation of aspects of the subject matter described herein from the subsequent detailed description, read together with the figures, and from the claims (which follow the detailed description).

In some embodiments, a second communication device is detected in proximity to a first communication device engaged in a call, and a substantially uninterrupted transfer of the call is provided to the second device. The call may be transferred automatically as a result of obtaining proximity with the second device, and/or as a result of operating at least one control of the first device. The volume of the communication with the first device may be gradually reduced, while gradually enhancing the volume of communication with the second device In some embodiments, the second communication device is detected in proximity to the first communication device by applying wireless communication between a third communication device and the second communication device. The third and second devices may communicate using Bluetooth wireless technology. The third communication device may be a device, such as a medallion, carried by a user of the first communication device.

BRIEF DESCRIPTION OF THE DRAWINGS

The headings provided herein are for convenience only and do not necessarily affect the scope or meaning of the claims.

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

Subject matter herein will now be described with respect to various embodiments. The following description provides specific details for a thorough understanding of, and enabling description for the claims. However, one skilled in the art will understand that the subject matter described herein may be practiced without these details. In other instances, well known structures and functions have not been shown or described in detail to avoid unnecessarily obscuring the description of the embodiments of the subject matter described herein. References to "one embodiment" or "an embodiment" do not necessarily refer to the same embodiment, although they may.

Figure 1:
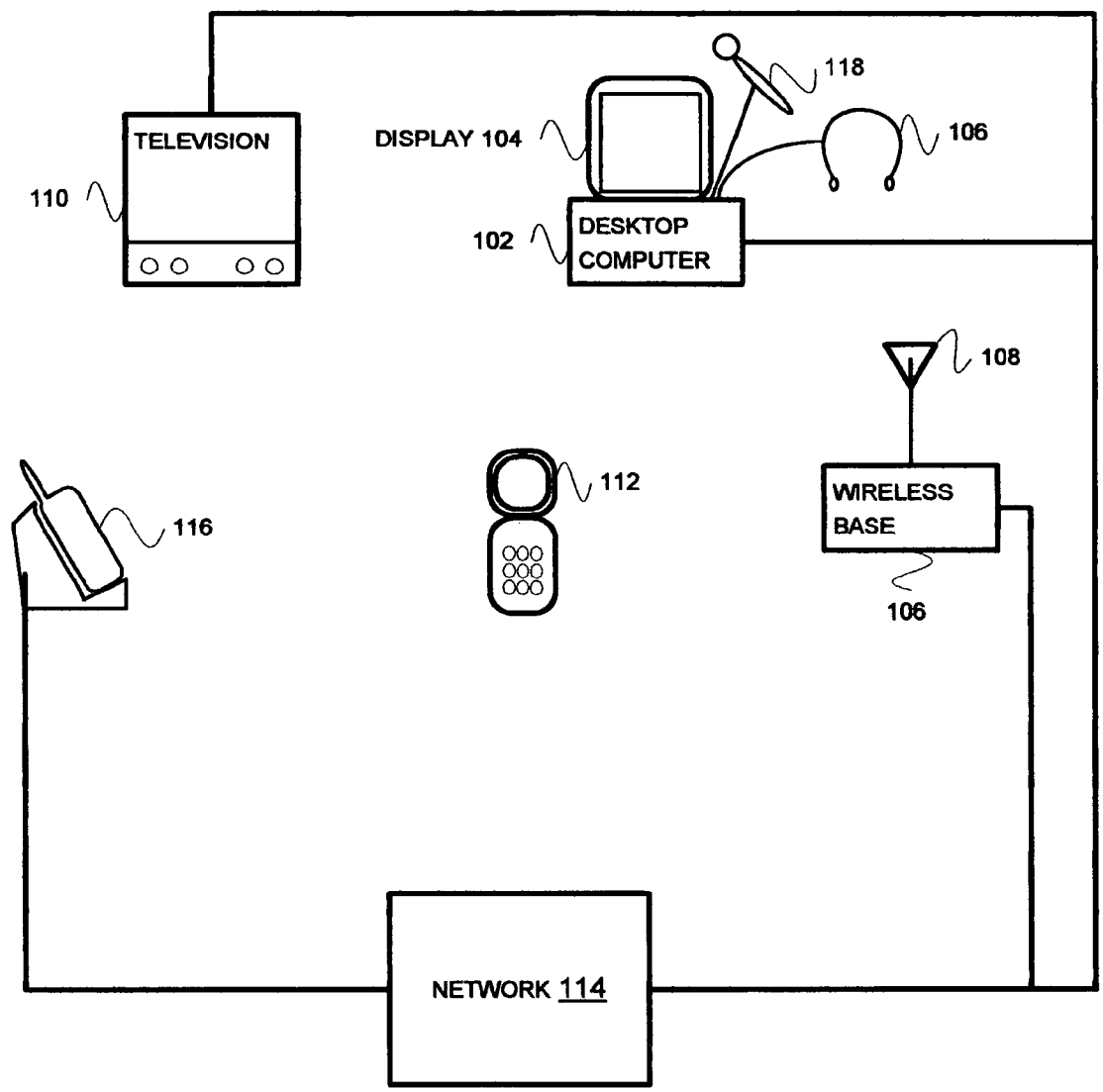
FIG. 1 is a block diagram of an embodiment of a communication environment.

FIG. 1 is a block diagram of a communication environment. The wireless communication device 112 provides wireless communication of signals to and from other devices. Examples of a wireless communication device include a cellular telephone 112, a wireless telephone handset 116, a personal digital assistant, and/or a laptop computer. The wireless communication device 112 may transmit arid receive analog and/or digital signals representing human voices. The wireless communication device 112 may also transmit and receive various forms of non-voice data.

The wireless communication device 112 exchanges signals with the network 114, either directly or via one or more antennas 108 of a co-located wireless base station 106.

The exchange of signals between the wireless device 112 and the network 114 may result in the establishment of a call, whereby the device user may obtain and/or provide voice and/or non-voice information with another person and/or with a computing device. For example, two individuals may engage in a conversation using their cellular telephones, such as device 112. Or, a user of device 112 may interact with a computing device to obtain his electronic mail.

The communication environment may comprise a desktop computer 102, which in turn may comprise a display 104 and/or speakers 106. Alternatively or additionally, some environments may include, for example, a laptop computer or a terminal interface to a central shared computing resource.

The display 104 provides for the display of visual information such as text, images, windows, menus, icons, and video. In some embodiments, the display 104 comprises cathode ray tube technology. In other embodiments, the display 104 comprises flat screen technology.

The speakers 106 provide rendering (e.g., playing) of audio information. In some embodiments, the speakers 106 comprise headphones. In other embodiments stand-alone and/or built-in speakers 106 may be used.

A microphone 118 converts sounds to audio information. In some embodiments, the microphone 118 is built into the computing device. The microphone 118 may also be integrated with the headset or may comprise a stand alone wired or wireless microphone. There may be more than one microphone 118 within the communications environment.

While the first communications device 112 is engaged in a call, proximity with a second communication device may be detected. Examples of a second communication device include a desktop computer 102, a laptop, a computer, a television 110, or a wireless telephone handset 116, to name just a few possibilities. The logic to detect proximity between two communication devices may reside within the first device 112, within the second device 102, 110, or 116, within the network 114, and/or within combinations of these and/or other devices. When used herein, logic may include circuitry and/or instructions stored within a memory which effects the indicated actions.

Detecting a second device 102, 110 or 116 may include detecting a wireless signal communicated by the second device 102, 110, or 116. Detecting a wireless signal communicated by the second device 102, 110, or 116 may include detecting an infrared signal, and/or applying Bluetooth communications between the first 112 and second 102, 110, or 116 devices.

Detecting a second communication device 102, 110, or 116 in proximity to a first communication device 112 engaged in a call may include identifying the second device 102, 110, or 116 from one or more images captured by the first 112 or second devices 102, 110, 116.

Detecting a second communication device 102, 110, or 116 in proximity to a first communication device 112 engaged in a call may include detecting that the first device 112 is in a physical area, and detecting that the second device 102, 110, or 116 is also in the area.

Detecting a second communication device 102, 110, or 116 in proximity to a first communication device 112 engaged in a call may include applying wireless communication between a third communication device and the second communication device 102, 110 or 116. The third device and the second device 102, 110 or 116 may communicate using Bluetooth technology. The third device may be carried by a user of the first communications device 112. For example, the third device may be a Bluetooth-capable medallion worn by the user of the first communications device 112.

When a second communications device 102, 110, or 116 is detected to be in proximity to the first communications device 112 which is engaged in a call, the call may be transferred in a substantially uninterrupted manner from the first device 112 to the second device 102, 110, or 116. Providing substantially uninterrupted transfer of the call to the second device 102, 110, or 116 may include identifying the second device 102, 110, or 116 to a network 114 by which the call is provided. The network 114 may substantially duplicate the call to the second device 102, 110, or 116. The logic to accomplish the transfer of the call may reside within the network 114 or within some combination of the network and other devices, such as, for example, the first device 112.

In some embodiments, after proximity is detected between the first device 112 and the second device 102, 110, or 116, transfer may occur automatically. Transfer may also occur after user manipulation of a control on the first device 112. Controls of the first device 112 may include at least one button, lever, dial, touch-sensitive area, switch, or voice command control. For example, the user may be provided with an option on the device's 112 display which, if selected, may initiate call transfer.

Alternatively, transfer may occur after user manipulation of a control on the second device 102, 110, or 116. For example, if the second device is a computer 102, its display may show an option which, if selected, may initiate call transfer. In some embodiments, the call may be transferred in response to motion of the first device toward the second device. In some embodiments, the call may be transferred in response to orienting the first device toward the second device.

In some embodiments, after the call has been transferred to the second device 102, 110, or 116, it may be transferred in a substantially uninterrupted manner back to the first device 112. The transfer back to the first device 112 may in some embodiments occur automatically. As an example, automatic transfer back to the first device 112 may occur when the first device 112 is moved out of proximity with the second device 102, 110, or 116. The transfer back to the first device 112 may also occur as a result of user manipulation of a control on the first device 112 or on the second device 102, 110, or 116.

Transferring the call from the first device 112 to the second device 102, 110, or 116 may include terminating the call from the perspective of the first device 112. In some embodiments, transferring the call includes terminating the call to the first device 112 from the perspective of the network 114. If a second call is received, the second call may automatically or under user control also be transferred to the second device 102, 110, or 116.

In some embodiments, communications to the first 112 and second 102, 110, or 116 devices may be routed through a central premise device, such as the base station 106.

In some embodiments, communications to the second device 102, 110, or 116 may be routed through the first device 112.

In some embodiments where a central premise device 106 or the first device 112 provides the interface to the second device 102, 110, or 116, the network 114 and its logic may not be involved in accomplishing the call transfer. In that situation, the call, from the standpoint of the network 114, may still be ongoing with the first device 112.

In some embodiments, although the call has been transferred to the second device 102, 110, or 116, the user may be able to perform some control functions with respect to the call by manipulating controls on the first device 112. For example, the user may be able to terminate the call by manipulating a control on the first device 112.

In some embodiments, the user will additionally or alternatively be able to perform some control functions with respect to the call by manipulating controls on the second device 102, 110, or 116.

Figure 2:
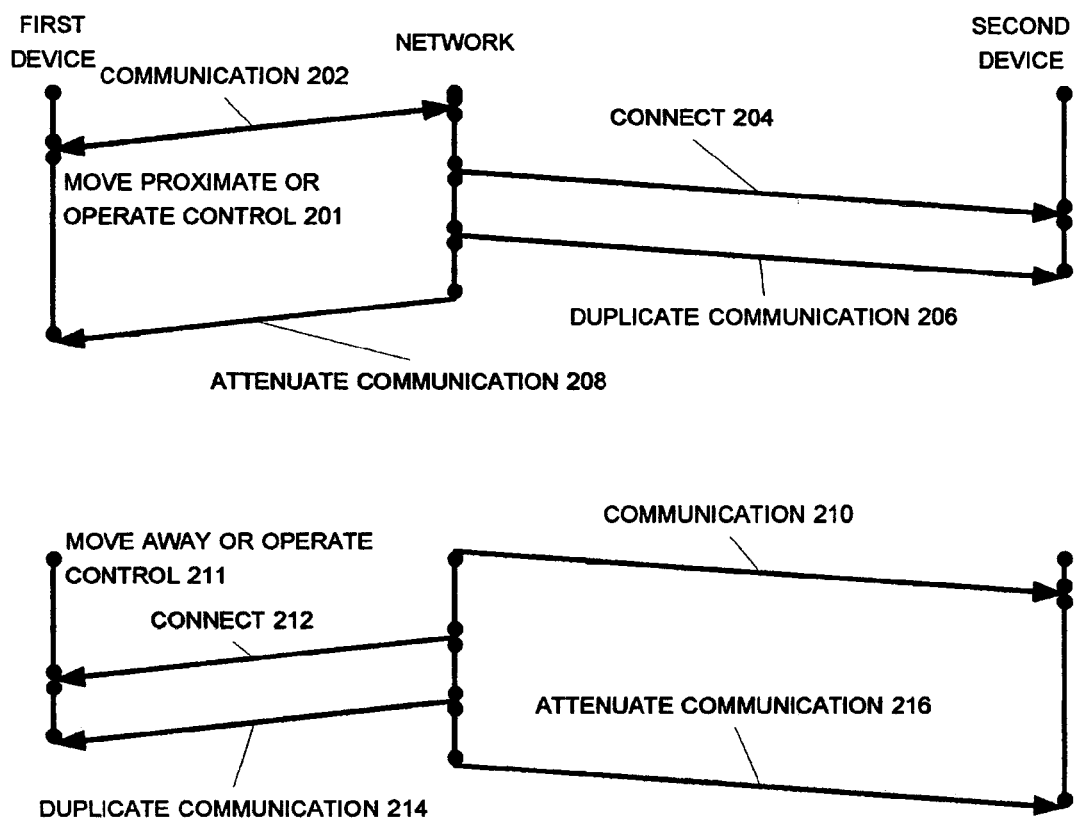
FIG. 2 is an action flow diagram of an embodiment of a communication transfer process.

FIG. 2 is an action flow diagram of an embodiment of a communication transfer process initiated by action of the first device. At 202, communication takes place between the first device and the network. At 201, transfer of the call which is active on the first device is initiated (e.g., transfer to occur to the second device). Transfer may be initiated automatically when the first device becomes proximate with the second device. Alternatively and/or in conjunction with proximity, the user may operate a control on the first device and/or second device to initiate transfer.

In some embodiments, the user may operate a control in response to either/both the first or second device providing an indication that a call transfer is available. The device in most embodiments would provide this indication after proximity has been detected. Examples of the first device providing an indication that a call transfer is available, include the first device providing at least one touch screen selection, activating a light emitting diode or other visual indication, and/or providing a tone or other audible indication. An example of the second device providing an indication would be providing, on its display, a message indicating proximity exists along with an option to initiate transfer.

At 204, the network provides a call connection to the second device. At 206, the network duplicates the communication to the second device. The duplication of communication which may occur accomplishes, from the user's perspective, a substantially uninterrupted call as transfer is accomplished. This may be advantageous as the user's attention need not move instantaneously from the first to second device.

At 208, the network attenuates communication to the first device,(while possibly enhancing communication to the second device). Gradually attenuating communication with the first device may include gradually reducing a volume of the communication with the first device. Gradually enhancing communication with the second device may include gradually increasing the volume of communication with the second device.

In a second scenario, at 210 the communication takes place between the network and the second device. At 211, transfer of the call which is active on the second device is initiated (transfer to occur to the first device). Transfer may be initiated automatically when the second device is no longer proximate with the first device (and thus presumably, the first device and its user have moved away from the second device). Alternatively, the user may operate a control on the first or second device to initiate transfer.

At 212, the network provides a call connection to the first device. At 214, the network duplicates the communication to the first device. At 216, communication to the second device is attenuated (while possibly enhancing communication to the first device).

The network may be actively involved in accomplishing the call transfer in the above scenarios. Alternatively, in some embodiments, the network may be unaware that a call transfer is occurring. In those embodiments, all and/or part of logic to accomplish the call transfer, including duplicating and enhancing or attenuating communications as indicated, may be performed by elements other than the network. For example, the first device might act as a pass-through for communications with the second device.

Figure 3:
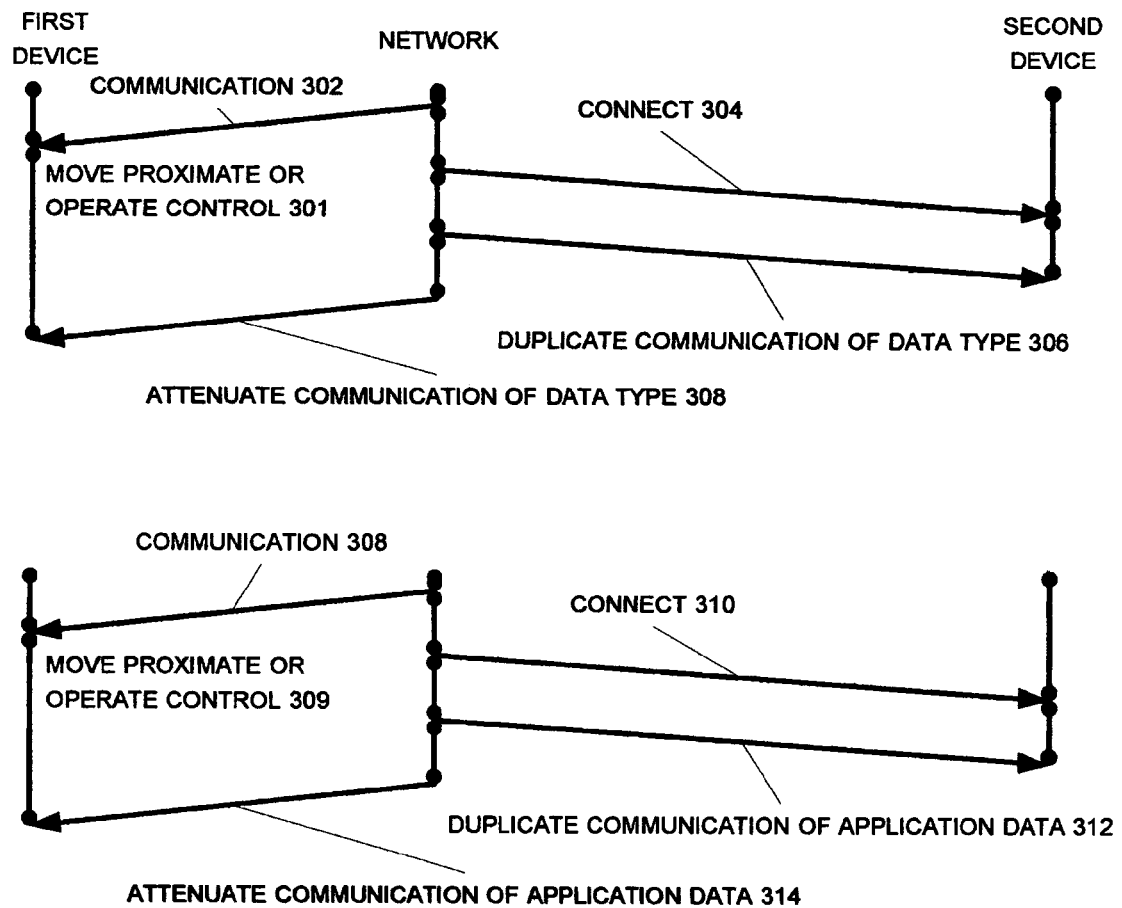
FIG. 3 is an action flow diagram of an embodiment of a partial communication transfer process.

FIG. 3 is an action-flow diagram of an embodiment of the partial communication transfer process. At 302, communication takes place between the first device and the network. At 301, the first device moves proximate to the second device, and/or the user of the first device operates a control of the first and/or second devices.

At 304, the network provides a call connection to the second device.

At 306, one or more particular data types occurring within the call to the first device are duplicated to the second device. This duplication may be performed wholly or in part by logic within the network, as is shown in FIG. 3.

Alternatively, in other embodiments, the network may not participate in duplication of a portion of the call to the first device. For example, the first device may act as a conduit for specific call information to the second device, without intervention of the network.

Thus, as shown in FIG. 3, a portion of the call state (for one or more data types) is duplicated. For example, if the second device has speakers, sounds which are sent to the first device may be expressed through the speakers of the second device. For this same call, other types of communication, such as inbound text messages, may still occur through the first device.

As a second example, if the second device were a television, sounds and images destined for the first device might be duplicated or expressed on the television. For this same call, images which include text might additionally be expressed on the first device, where data entry would occur.

To accomplish partial call transfer for a particular data type or types, the effecting computing elements (e.g. processor(s) and logic of the first device, and/or second device, and/or network) may detect the data type of communication data. Examples of a data type of communication include voice, video, data file, or music.

Additionally, the capabilities of the proximate device for rendering the data type may be recognized. Examples include facilities for displaying images, playing video, and/or playing sound or music.

Accomplishing a partial call transfer may include maintaining communication with the first device of data not having the selected data type(s), and transferring data having the selected data type(s) to the proximate device.

At 308, the network attenuates communication of the data type (for example, sounds) to the first device. In other embodiments, as previously indicated, attenuation may be performed by the first (or second) devices without involvement by the network.

In another scenario, at 308 communication occurs to the first device. At 309, proximity and/or user manipulation of a control on the first and/or second device results in initiation of a partial call transfer. At 310, a connection occurs to the second device as a result of this initiation. At 312, the network and/or other computing elements duplicates communication of particular application data to the second device (e.g. duplicates data to the second device for which there is a well-suited application of the second device). For example, if the second device were a computer having a media player application, and the first a cellular phone, it might be recognized that electronic video messages are well suited to be handled on the second device.

To accomplish partial call transfer for data associated with a particular application, applications associated with particular communication data may be recognized. Examples of likely applications include a chat application, a messaging application, a game application, a video application, an image processing application, a music application, or an audio application.

Additionally, some of the capabilities of a proximate device may be recognized, possibly including identification of the capability to provide certain applications.

Additionally, device states and data may be maintained and communicated to accomplish a substantially uninterrupted transfer to the proximate device of data associated with the application. For example, file attachments associated with an email message may be transferred along with ongoing communications.

At 314, the network attenuates communication of the application data to the first device and possibly enhances communication of the application data to the second device.

As mentioned before, in other embodiments this functionality may be accomplished without the involvement of network logic, e.g. the first device acts as a conduit of the data type(s) to the second device.

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

Those skilled in the art will recognize that optical aspects of implementations will require optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter subject matter described herein, including the control system 608 may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Unless the context clearly requires otherwise, throughout the description and the claims, the words "comprise," "comprising," and the like, are to be construed in an inclusive sense as opposed to an exclusive or exhaustive sense. Or in other words, for the purposes of "including, but not limited to." Words using the singular or plural number also include the plural or singular number respectively. Additionally, the words "herein," "above," "below" and words of similar import, when used in this application, shall refer to this application as a whole and not to any particular portions of this application separately. When the claims use the word "or" in reference to a list of two or more items, that word covers all of the following interpretations of the word: any of the items in the list, all of the items in the list and any combination of the items in the list.

What is claimed is:

1. A method comprising:
   detecting a second communication device in proximity to a first communication device engaged in a call; and
   providing substantially uninterrupted transfer of the call to the second device,
   wherein detecting a second communication device in proximity to a first communication device engaged in a call further comprises:
   identifying the second communication device from one or more images.

2. The method of claim 1, wherein the second communication device further comprises:
   a desktop computer, a laptop computer, a television, or a wireless telephone handset.

3. A method comprising:
   detecting a second communication device in proximity to a first communication device engaged in a call; and
   providing substantially uninterrupted transfer of the call to the second device,
   wherein detecting a second communication device in proximity to a first communication device engaged in a call further comprises:
   identifying the second communication device from one or more images; and
   the second communication device further comprises:
   a desktop computer, a laptop computer, a television, or a wireless telephone handset.

4. A method comprising:
   detecting a second communication device in proximity to a first communication device engaged in a call; and providing substantially uninterrupted transfer of the call to the second device, wherein providing substantially uninterrupted transfer of the call to the second device further comprises:
gradually attenuating communication with the first device.

5. The method of claim 4, wherein detecting a second communication device in proximity to a first communication device engaged in a call further comprises:
applying Bluetooth communications between the first and second communication devices.

6. The method of claim 4, wherein the second communication device further comprises: a desktop computer, a laptop computer, a television, or a wireless telephone handset.

7. The method of claim 4, wherein detecting a second communication device in proximity to a first communication device engaged in a call further comprises:
detecting a wireless signal communicated by the second device.

8. The method of claim 7, wherein detecting a wireless signal communicated by the second device further comprises:
detecting an infra-red signal.

9. The method of claim 4, wherein providing substantially uninterrupted transfer of the call to the second device further comprises:
substantially duplicating information of the call to the second device while the call is ongoing with the first device.

10. The method of claim 4, wherein providing substantially uninterrupted transfer of the call to the second device further comprises:
establishing a call connection to the second device and substantially duplicating call information to the second device.

11. The method of claim 4, wherein providing substantially uninterrupted transfer of the call to the second device further comprises:
transferring the call automatically as a result of obtaining proximity with the second device.

12. The method of claim 4, wherein providing substantially uninterrupted transfer of the call to the second device further comprises:
transferring the call to the second device as a result of operating at least one control of the first device.

13. The method of claim 12, wherein the control of the first device further comprises:
at least one button, lever, dial, touch-sensitive area, switch, or voice command control.

14. The method of claim 4, wherein providing substantially uninterrupted transfer of the call to the second device further comprises:
transferring the call in response to operation of a control of the second device.

15. The method of claim 14, wherein the control of the second device further comprises:
at least one button, lever, dial, touch-sensitive area, switch, or voice command control.

16. The method of claim 4, wherein providing substantially uninterrupted transfer of the call to the second device further comprises:
identifying the second device to a network by which the call is provided, the network substantially duplicating the call to the second device.

17. The method of claim 4, wherein providing substantially uninterrupted transfer of the call to the second device further comprises:
providing transfer of the call in response to motion of the first device toward the second device.

18. The method of claim 4, wherein providing substantially uninterrupted transfer of the call to the second device further comprises:
providing transfer of the call in response to orienting the first device toward the second device.

19. The method of claim 4, wherein detecting a second communication device in proximity to a first communication device engaged in a call further comprises:
detecting that the first device is in a physical area, and detecting that the second device is also in the physical area.

20. The method of claim 4, wherein detecting a second communication device in proximity to a first communication device engaged in a call further comprises:
applying wireless communication between a third communication device and a second communication device.

21. The method of claim 4, wherein the first communication device further comprises:
a cell phone, a wireless telephone handset, a personal digital assistant, or a laptop computer.

22. The method of claim 4, wherein the second communication device further comprises:
a desktop computer, a laptop computer, a television, or a wireless telephone handset.

23. The method of claim 4, wherein the first communication device further comprises:
a Bluetooth medallion.

24. The method of claim 4, further comprising:
providing substantially uninterrupted transfer of the call back to the first device.

25. The method of claim 24, wherein providing substantially uninterrupted transfer of the call back to the first device further comprises:
providing transfer of the call back to the first device in response to the first device moving away from the second device.

26. The method of claim 24, wherein providing substantially uninterrupted transfer of the call back to the first device further comprises:
providing transfer of the call back to the first device in response to operating a control of the first device.

27. The method of claim 26, wherein the control of the first device further comprises:
at least one button, lever, dial, touch-sensitive area, switch, or voice command control.

28. The method of claim 24, wherein providing substantially uninterrupted transfer of the call back to the first device further comprises:
providing transfer of the call back to the first device in response to operation of a control of the second device.

29. The method of claim 28, wherein the control of the second device further comprises:
at least one button, lever, dial, touch-sensitive area, switch, or voice command control.

30. The method of claim 4, further comprising:
terminating communication with the first device.

31. The method of claim 4, further comprising:
the first device receiving a second call; and
transferring the second call to the second device.

32. The method of claim 4, further comprising:
substantially duplicating at least a portion of the state of the call on the second device.

33. The method of claim 4, further comprising:
routing communications to the first and second devices through a central premise device.

34. The method of claim 4, further comprising:
routing communications to the second device through the first device.

35. The method of claim 4, further comprising:
as a result of detecting proximity of the second device and the first device, the first device providing an indication that call transfer is available.

36. The method of claim 35, wherein the first device providing an indication that call transfer is available further comprises:
the first device providing an indication that call transfer to the second device is available.

37. The method of claim 35, wherein the first device providing an indication that call transfer is available further comprises:
the first device providing at least one of a touch screen selection, activating a light emitting diode or other visual indication, or providing a tone or other audible indication.

38. A method comprising:
detecting a second communication device in proximity to a first communication device engaged in a call; and
providing substantially uninterrupted transfer of the call to the second device, wherein providing substantially uninterrupted transfer of the call to the second device further comprises:
gradually attenuating communication with the first device; and
gradually attenuating communication with the first device further comprises:
gradually reducing a volume of the communication with the first device.

39. A method comprising:
detecting a second communication device in proximity to a first communication device engaged in a call; and
providing substantially uninterrupted transfer of the call to the second device, wherein detecting a second communication device in proximity to a first communication device engaged in a call further comprises:
applying wireless communication between a third communication device and the second communication device, and applying wireless communication between a third communication device and the second communication device further comprises:
applying Bluetooth communication between the second communication device and a device carried by a user of the first communication device.

40. A method comprising:
detecting a second communication device in proximity to a first communication device engaged in a call; and
providing substantially uninterrupted transfer of the call to the second device,
wherein detecting a second communication device in proximity to a first communication device engaged in a call further comprises:
applying wireless communication between a third communication device and the second communication device,
applying wireless communication between a third communication device and the second communication device further comprises:
applying Bluetooth communication between the second communication device and a device carried by a user of the first communication device, and
applying Bluetooth communication between the second communication device and a device carried by a user of the first communication device further comprises:
applying Bluetooth communication between the second communication device and a medallion worn by the user of the first communication device.

41. A method comprising:
detecting a second communication device in proximity to a first communication device engaged in a call; and
providing substantially uninterrupted transfer of the call to the second device,
wherein detecting a second communication device in proximity to a first communication device engaged in a call further comprises:
applying wireless communication between a third communication device and the second communication device,
applying wireless communication between a third communication device and the second communication device further comprises:
applying Bluetooth communication between the second communication device and a device carried by a user of the first communication device,
applying Bluetooth communication between the second communication device and a device carried by a user of the first communication device further comprises:
applying Bluetooth communication between the second communication device and a medallion worn by the user of the first communication device, and
the first communication device further comprises:
a cell phone, a wireless telephone handset, a personal digital assistant, or a laptop computer.

42. A method comprising:
detecting a second communication device in proximity to a first communication device engaged in a call; and
providing substantially uninterrupted transfer of the call to the second device,
wherein detecting a second communication device in proximity to a first communication device engaged in a call further comprises:
applying wireless communication between a third communication device and the second communication device,
applying wireless communication between a third communication device and the second communication device further comprises:
applying Bluetooth communication between the second communication device and a device carried by a user of the first communication device,
applying Bluetooth communication between the second communication device and a device carried by a user of the first communication device further comprises:
applying Bluetooth communication between the second communication device and a medallion worn by the user of the first communication device, and
the second communication device further comprises:
a desktop computer, a laptop computer, a television, or a wireless telephone handset.

43. A method comprising:
detecting a second communication device in proximity to a first communication device engaged in a call; and
providing substantially uninterrupted transfer of the call to the second device,
wherein detecting a second communication device in proximity to a first communication device engaged in a call further comprises:
applying wireless communication between a third communication device and the second communication device,
applying wireless communication between a third communication device and the second communication device further comprises:

applying Bluetooth communication between the second communication device and a device carried by a user of the first communication device, and the first communication device further comprises:
a cell phone, a wireless telephone handset, a personal digital assistant, or a laptop computer.

44. A method comprising:
detecting a second communication device in proximity to a first communication device engaged in a call; and
providing substantially uninterrupted transfer of the call to the second device,
wherein detecting a second communication device in proximity to a first communication device engaged in a call further comprises:
applying wireless communication between a third communication device and the second communication device,
applying wireless communication between a third communication device and the second communication device further comprises:
applying Bluetooth communication between the second communication device and a device carried by a user of the first communication device, and
the second communication device further comprises:
a desktop computer, a laptop computer, a television, or a wireless telephone handset.

45. A method comprising:
detecting a second communication device in proximity to a first communication device engaged in a call; and
providing substantially uninterrupted transfer of the call to the second device,
wherein detecting a second communication device in proximity to a first communication device engaged in a call further comprises:
applying wireless communication between a third communication device and the second communication device,
applying wireless communication between a third communication device and the second communication device further comprises:
applying Bluetooth communication between the second communication device and a device carried by a user of the first communication device, and
the first communication device further comprises:
a Bluetooth medallion.

46. A method comprising:
detecting a second communication device in proximity to a first communication device engaged in a call; and
providing substantially uninterrupted transfer of the call to the second device,
wherein providing substantially uninterrupted transfer of the call to the second device further comprises:
gradually enhancing communication with the second device.

47. A method comprising:
detecting a second communication device in proximity to a first communication device engaged in a call; and
providing substantially uninterrupted transfer of the call to the second device,
wherein providing substantially uninterrupted transfer of the call to the second device further comprises:
gradually enhancing communication with the second device, and
gradually enhancing communication with the second device further comprises:
gradually increasing a volume of communication with the second device.

48. A method comprising:
detecting a second communication device in proximity to a first communication device engaged in a call;
providing substantially uninterrupted transfer of the call to the second device; and
providing substantially uninterrupted transfer of the call back to the first device,
wherein providing substantially uninterrupted transfer of the call back to the first device further comprises:
gradually attenuating communication with the second device.

49. A method comprising:
detecting a second communication device in proximity to a first communication device engaged in a call;
providing substantially uninterrupted transfer of the call to the second device; and
providing substantially uninterrupted transfer of the call back to the first device,
wherein providing substantially uninterrupted transfer of the call back to the first device further comprises:
gradually enhancing communication with the first device.

50. A method comprising:
detecting a second communication device in proximity to a first communication device engaged in a call;
providing substantially uninterrupted transfer of the call to the second device; and
providing substantially uninterrupted transfer of the call back to the first device,
wherein providing substantially uninterrupted transfer of the call back to the first device further comprises:
gradually enhancing communication with the first device, and
gradually enhancing communication with the first device further comprises:
gradually increasing a volume of communication with the first device.

* * * * *